Figure 1:
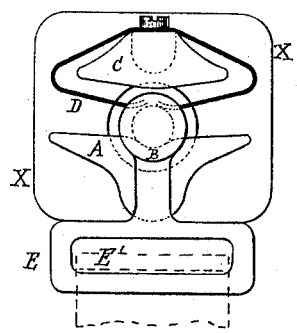

(No Model.)

G. BIEBUYCK.
SAFETY SADDLE BAR OR SUSPENDER FOR STIRRUP LEATHERS.

No. 440,459. Patented Nov. 11, 1890.

Witnesses:
Donn Twitchell
E. Sedgwick

Inventor:
G. Biebuyck
By Munn & Co.
Attorneys.

UNITED STATES PATENT OFFICE.

GUSTAVE BIEBUYCK, OF BRUSSELS, BELGIUM.

SAFETY SADDLE-BAR OR SUSPENDER FOR STIRRUP-LEATHERS.

SPECIFICATION forming part of Letters Patent No. 440,459, dated November 11, 1890.

Application filed May 9, 1890. Serial No. 351,187. (No model.) Patented in France October 11, 1889, No. 201,848; in England October 14, 1889, No. 18,194; in Germany October 19, 1889, No. 10,197; in Belgium October 26, 1889, No. 88,203, and in Austria-Hungary January 14, 1890.

*To all whom it may concern:*

Be it known that I, GUSTAVE BIEBUYCK, gentleman, a subject of the King of Belgium, and a resident of Brussels, in the Kingdom of Belgium, have invented a new and useful Improvement in Safety Saddle-Bars or Suspenders for Stirrup-Leathers, (for which I have obtained a patent in Belgium, No. 88,203, bearing date October 26, 1889; in France, No. 201,848, dated October 11, 1889; in Great Britain, No. 18,194, dated October 14, 1889; in Germany, No. 10,197, dated October 19, 1889, and in Austria-Hungary, dated January 14, 1890,) of which the following is a specification.

The improved safety saddle-bars or suspenders for stirrup-leathers according to this invention cause the stirrup-leather to be released automatically in case of accident, so as to render it impossible for the rider to be dragged owing to the foot becoming entangled in the stirrup.

The saddle-bars or suspenders for stirrup-leathers in common use present serious disadvantages. They are closed by means of a spring-plate, and if in falling the foot of the rider catches in the stirrup, this plate being rigid or stiff in the joint so as to be turned down with difficulty, the rider is liable to be dragged and receive fatal injuries. It is true that the suspenders are sometimes left open; but even in this case the stirrup-leathers are allowed so little room between the suspender-bar and the saddle that they do not slip off readily in case of accident, and the fallen rider remains suspended from the saddle. It also sometimes happens that the rider is thrown forward over the horse's head or that in dismounting his left foot catches in the stirrup. Under these conditions he cannot free himself, as the suspenders cannot open in front. All these disadvantages are obviated in the improved safety saddle-bar or suspender according to my invention. In fact, whether the rider fall forward or backward, the shock given by the horse or the mere weight of the rider disengages the stirrup-leather and stirrup from the saddle automatically, as hereinafter described.

In order that my said invention may be fully understood, I shall now proceed more particularly to describe the same, and for that purpose shall refer to the several figures on the annexed sheet of drawings, the same letters of reference indicating corresponding parts in all the figures.

Figure 2:
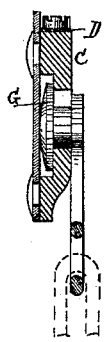
Figure 3:
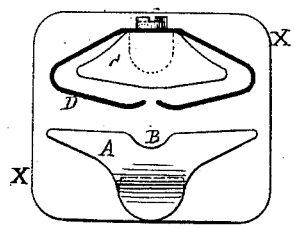
Figure 4:
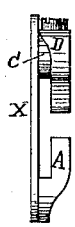

Figures 1 and 2 of the accompanying drawings represent, in elevation and transverse section, respectively, an example of a complete safety-suspender constructed according to my invention. Figs. 3 and 4 are side and end views of the part permanently attached to the saddle, and Figs. 5 and 6 are similar views of the part attached to the stirrup-leather.

The suspender is attached to the saddle-tree by means of a base-plate X of steel or other suitable metal. To this plate are attached, first, a concave under plate A, formed with a recess or notch B in its upper edge or surface, and, secondly, a top piece or plate C, surrounded by a spring D, the two ends of which pass under the plate C, and are slightly bent upward immediately above the notch B, as indicated in Figs. 1 and 3. The spring D is attached to the plate C by a screw with a heel notched or nicked in such a manner as to admit of being readily unscrewed.

Figure 5:
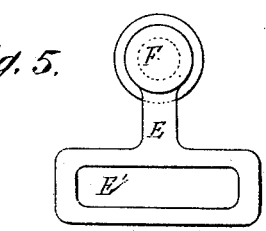
Figure 6:

The stirrup-leather is attached directly to a connecting piece or plate E, provided at its lower part with a suitable opening or loop E', Figs. 1 and 5, for the reception of the stirrup-leather and at its upper part with a stud or pin F, formed with a large or broad head G.

The stud or pin F lies in the notch B in the under plate A, and is retained in position by the two extremities of the legs of the spring D. The head G of the stud or pin F turns and slides between the base-plate X and the plates A and C. The stirrup-leather being thus free to swing or oscillate in all directions, the rider is enabled to readily move the stirrup forward or backward to a convenient position for putting the foot in the stirrup when mounting.

In case of accident, the shock of the fall of the rider, added to his weight, tends to pull the plate E, which is directly attached to the stirrup-leather, forward or backward, and causes the stud or pin F to slip out of the notch B, the spring D yielding sufficiently to allow it to pass, and the stirrup-leather being thus entirely disconnected from the saddle, the rider is automatically and instantly freed.

The suspender may evidently be closed in front, if desired, so that the stirrup-leather is freed by a backward pull only. With this object it is simply necessary to diminish the space between the plates A and C sufficiently to prevent the loop-plate E from escaping forward.

I claim—

1. A safety-stirrup support comprising an attaching-plate, a horizontal piece offset from the outer face of the plate and having a concavity in its upper edge between its ends, a second horizontal offset piece above the first-named piece, and a spring extending along the under edge of the upper piece, a horizontal space open from end to end being thus formed between the spring and the upper edge of the lower piece and an open channel or space being formed between the said attaching-plate and the said two pieces, and a stirrup-leather plate provided at its upper end on its inner face with a stud adapted to enter or leave said horizontal space at either end and rest in the said concavity in contact with said spring, and a head on the stud to pass into and out of said open channel behind the said two pieces, substantially as set forth.

2. A safety-stirrup support consisting of the attaching-plate X, provided on its outer face with a lower horizontal offset piece A, having a central concavity B in its upper edge, an upper piece C, also offset from the attaching-plate, a spring D, secured to the upper edge of the piece C, bowed therearound, with its ends opposing at a point over the central concavity B, and a stirrup-leather supporting-plate E, provided at its upper end on its inner side with a stud F to pass freely in either direction into and out of the horizontal space between the upper edge of piece A and the spring and to rest in said concavity, and provided with a head to pass into and out of the spaces behind the two pieces A C from either end, substantially as set forth.

In testimony whereof I have signed my name to this specification in the presence of two subscribing witnesses.

GUSTAVE BIEBUYCK.

Witnesses:
GUSTAVE PIERRY,
EMILE NUYTS.